Jan. 25, 1949.   F. L. CARROLL   2,460,125
FOLDING CHARCOAL COOKING GRILL
Filed Oct. 23, 1945   2 Sheets-Sheet 1
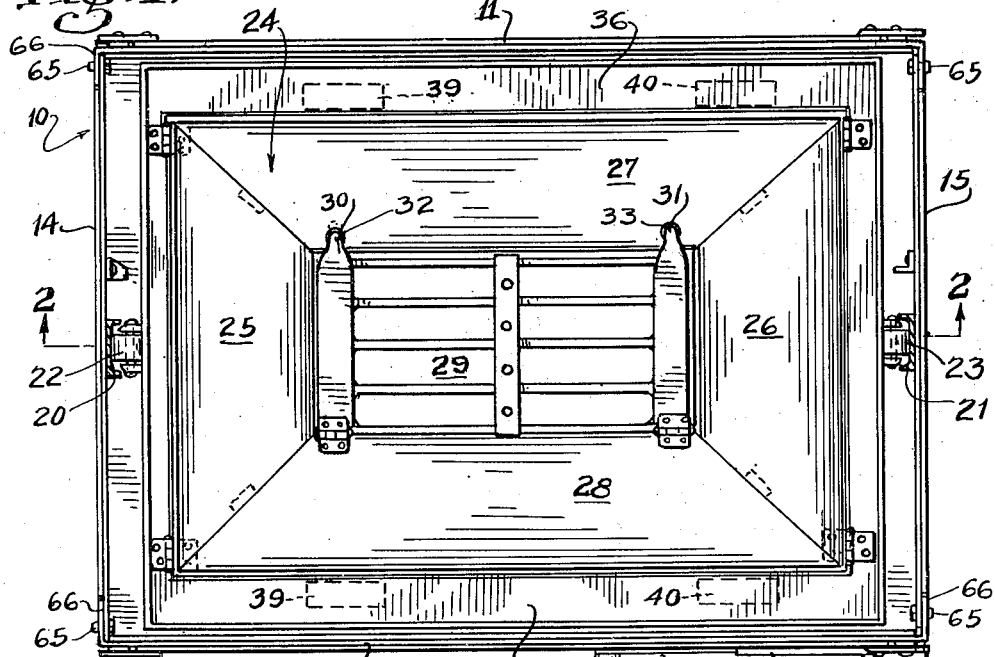
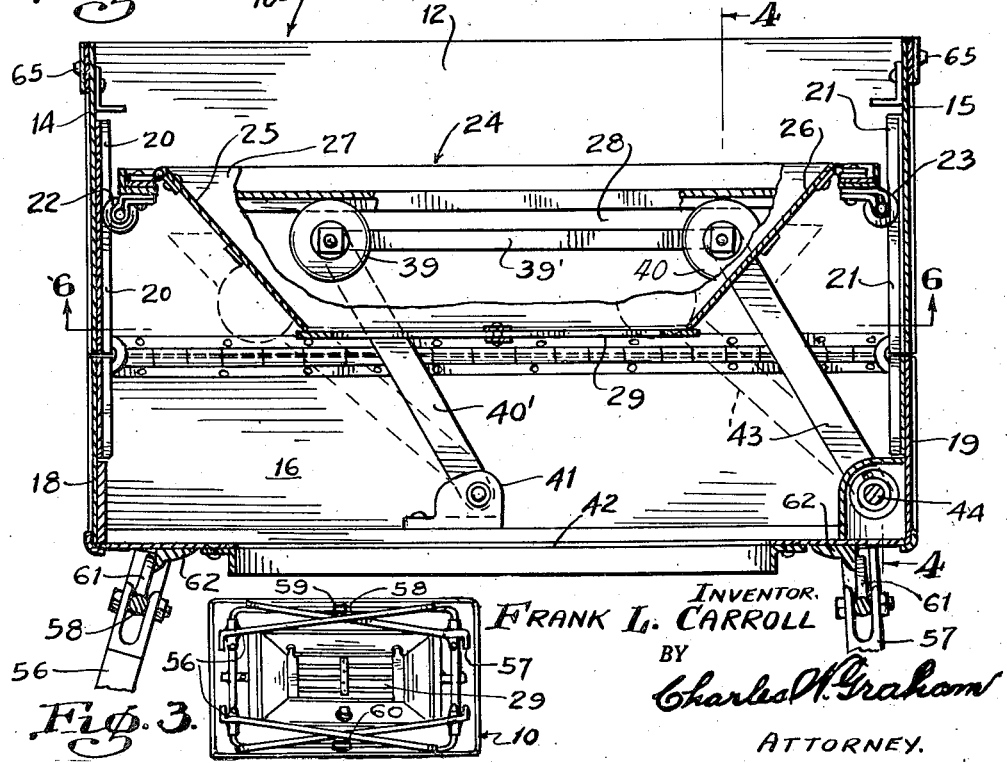
INVENTOR.
FRANK L. CARROLL
BY
Charles W. Graham
ATTORNEY.

Jan. 25, 1949. F. L. CARROLL 2,460,125
FOLDING CHARCOAL COOKING GRILL
Filed Oct. 23, 1945 2 Sheets-Sheet 2
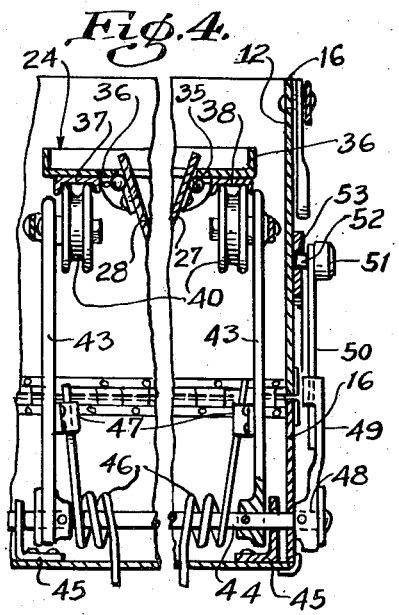
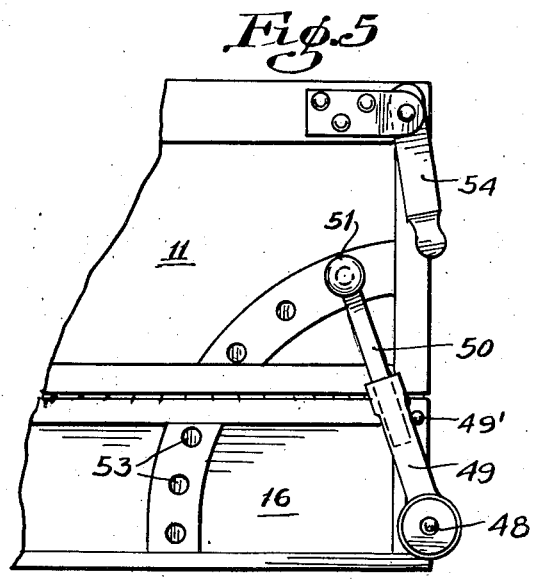
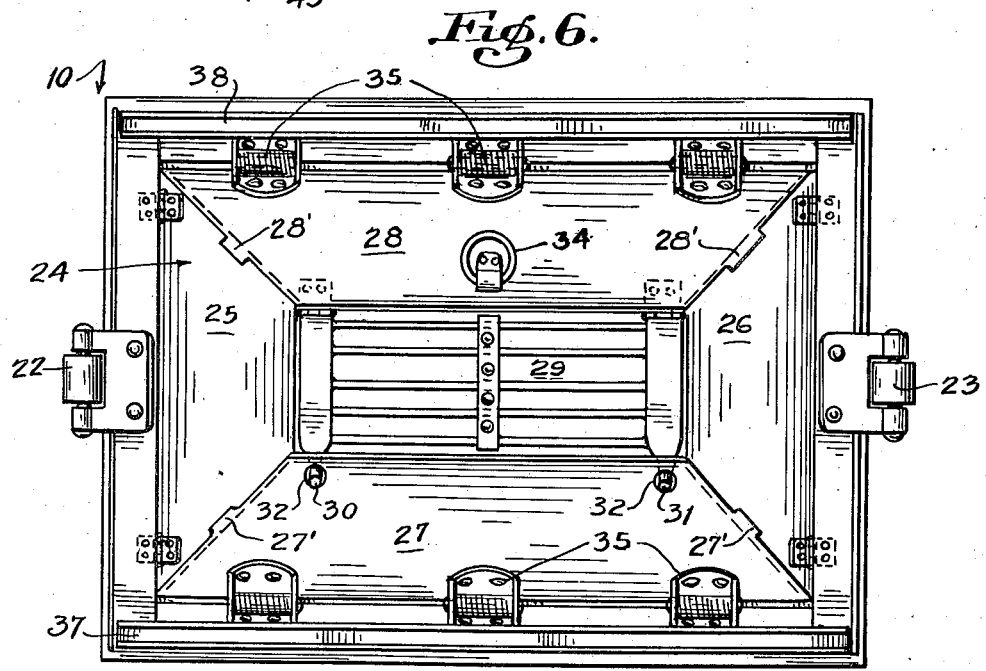
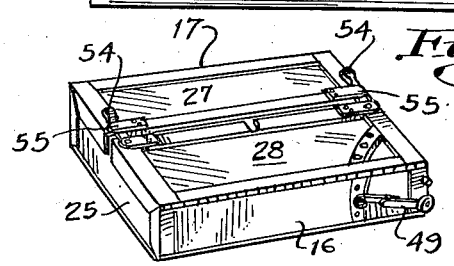
INVENTOR
FRANK L. CARROLL
BY Charles W. Graham
ATTORNEY Patented Jan. 25, 1949

2,460,125

UNITED STATES PATENT OFFICE 2,460,125

FOLDING CHARCOAL COOKING GRILL

Frank Lawrence Carroll, North Hollywood, Calif.

Application October 23, 1945, Serial No. 624,040

8 Claims. (Cl. 126—9)

The present invention relates to a folding charcoal cooking grill.

An important object of the invention is to provide a cooking grill that may be folded so that it is not much larger than a book. The grill is then so compact that it may be readily carried from place to place when used on hunting, camping and fishing trips, and can also be easily placed under an automobile seat.

The cooking grill is supported by a novel form of legs that fold completely, and when open, are held at an angle of about ten (10°) degrees, so that the grill is supported in a perfectly balanced position and cannot be accidently tipped over.

This cooking grill includes a novel fire box that may be readily adjusted by a woman or a child, since the weight is perfectly balanced by a hidden spring.

Another object of the invention is to provide a novel cooking grill having a fire box that may easily be cleaned by pulling a conveniently placed ring.

The cooking grill is made of simple, easily manufactured parts and is practical from a commercial standpoint.

Other objects and advantages of the invention will become apparent from the following description.

In the drawings:

Figure 1 is a plan view of the novel folding cooking grill.

Figure 2 is a vertical section on line 2—2 of Figure 1, with parts left in elevation.

Figure 3 is a bottom plan view of the folded grill.

Figure 4 is a section on line 4—4 of Figure 2.

Figure 5 is a fragmentary elevation of the means for adjusting the fire box.

Figure 6 is a section on the line 6—6 of Figure 2, the view omitting the side walls of Figure 2.

Figure 7 is a perspective view of the grill in folded position.

In the drawings 10 designates the grill in general. 11 and 12 are the upper side walls, having asbestos linings, and 14 and 15 are the upper end walls. Hinged to the upper walls are lower walls 16, 17, 18 and 19. The end walls are provided with guides 20 and 21 adapted to guide rollers 22 and 23 carried by the adjustable fire box 24.

The fire box 24 has sloping, downwardly converging mitered walls 25, 26, 27 and 28 and an open-work base 29. The base 29 has prongs 30 and 31 adapted to normally enter apertures 32 and 33 in wall 27, and a pull ring 34 attached to wall 28 is utilized to withdraw the prongs when the fire box is to be folded flat.

Spring hinges 35 are fixed to the upper frame 36 of the fire box and to the sloping walls 27 and 28. Channel tracks 37 and 38 are fixed to the frame 36 and are adapted to receive rollers 39 and 40. The rollers 39 are supported at the upper end of arms 40' pivoted to the bracket 41 carried by base plate 42.

The rollers 40 are supported by arms pivoted at their lower ends to a rod 44 carried by brackets 45 on base 42. Coil springs 46 are provided on the rod 44, their long free ends being attached to arms 43 at 47, see Figure 4, and their short free ends being anchored in the base 42.

The rod 44 extends outside of the grill as at 48 and carries a stub handle 49. The upper part of the handle is provided with a resilient extension 50 having a knob 51 and lug 52 adapted to rest in sockets 53 in adjusted position. Lug 49' acts as a stop for handle 50.

Latches 54 and detents 55 are carried by the grill for use in the folded position shown in Figure 7. Upon releasing latches 54, the end walls 14 and 15, being hinged with spring hinges, automatically forces side walls 11 and 12 to vertical position, which are then locked automatically through pin 65 entering apertures 66.

The supporting legs 56 and 57 for the grill are pivotally mounted on a rectangular rod frame 58 supported at 59 and 60. As in Figure 2 the rod 58 is provided with lugs 61 adapted to engage members 62 on the base to hold the legs at an angle of approximately ten (10°) degrees. Figure 3 shows how the legs may be folded against the bottom of the fire box in compact arrangement.

As in Figures 1 and 2, the upper walls are automatically held in alignment by pins 65, received in the apertures of angles 66, carried by walls 11 and 12.

In the use of my cooking grill the fuel, usually consisting of charcoal or the like, is placed on the open work portion 29 and the meat or other food to be cooked is placed upon a holder (not shown).

As shown in Figure 2, the fire box may be raised or lowered with respect to the meat holder and the hidden springs 46 may be depended upon to counterbalance the weight of the fire box. As in Figure 5, it is evident that the fire box may be locked in a number of adjusted positions to obtain the best results.

When it is desired to clean the fire box it is merely necessary to pull the ring 34, this releasing the prongs 30 and 31 from the apertures 32 and 33, and permitting the walls to drop and deposit the residue. When the walls of the fire box are restored to their normal position, it is evident from Figure 6, that the spring hinges 35 will support the walls 27 and 28, and the lugs 27' and 28' carried thereby will support the end walls 25 and 26.

When it is desired to fold the grill into the position shown in Figure 7, it is merely necessary to pull the ring 34 to collapse the fire box, fold in the upper end walls 14 and 15, and then fold in the upper side walls 11 and 12. The latches 54 are then swung under detents 55 and the legs folded under as shown in Figure 3.

From the foregoing it is evident that I have provided a novel, practical and simple cooking grill that may be readily transported from place to place on fishing, hunting and camping trips and may easily be placed in cooking position.

The novel, adjustable fire box can be handled by even a small child and insures the most efficient cooking of the food. The novel leg arrangement, when open, insures against accidental tipping over of the grill and when folded occupies very little space.

Numerous changes in the size, shape and the arrangement of the parts may be made without departing from the spirit of the invention or the scope of the appended claims.

What I claim is:

1. A cooking grill comprising a box-like base having fixed vertical walls, an upper wall member hingedly connected to the upper end of each of said fixed walls and thereby adapted to be swung to vertical position or inwardly relative to said lower fixed walls, a fire box frame within, and slidingly engaging opposite pairs of said lower and upper walls, rails fixed to the lower side of said frame, adjustable means, including rollers adapted to engage said rails, whereby said frame may be vertically adjusted while in horizontal position, said frame in its lowest adjusted position resting wholly within said lower fixed walls and freeing said upper walls for inward swinging movement to cover said frame, and means for temporarily securing said upper walls in said inward positions.

2. A cooking grill of the character described in claim 1, wherein the vertical sliding engagement between the fire box frame and adjacent walls is effected through rollers mounted on said frame and guide rails mounted on said walls, said rollers engaging and being guided by said rails.

3. A cooking grill of the character described in claim 1 wherein the means for temporarily securing the upper walls in their inward position comprises latches and co-acting detents mounted on opposite upper walls adjacent the free ends thereof.

4. A cooking grill of the character described in claim 1 wherein said base is provided with supporting legs foldably attached thereto.

5. A cooking grill of the character described in claim 1 wherein the rollers engaging the rails on the lower side of the horizontally disposed fire box frame are adapted to be moved vertically in unison through a parallel motion linkage actuated by a handle, said handle being provided at its free end with a lug adapted to lockingly engage a series of counterpart elements on said side walls, whereby said frame may be retained at one of several elevations, dependent upon the counterpart element thus engaged.

6. A cooking grill of the character described in claim 1 wherein the fire box frame carries a series of mitered walls hingedly connected thereto, and a grate member hingedly connected to the free end of one of said mitered walls, said mitered walls and grate having interlocking means to hold them in operative positions wherein they assume the form of an inverted frustum of a pyramid to hold fuel during combustion, and said walls, upon release of said locking means, being collapsible, by virtue of said hinge connections, to substantially flat horizontal positions.

7. A cooking grill comprising a casing, a fire box vertically movable in horizontal position within said casing, said fire box comprising a frame having an opening therein, inwardly converging walls hinged to said frame adjacent said frame opening, springs mounted on said frame and walls to urge said walls inwardly, a grate hingedly mounted on the free end of one of said walls and having locking means engageable with counterpart locking means adjacent the free end of another of said walls to hold said walls in open position, in which position they assume substantially the form of an inverted frustum of a pyramid, said walls, upon release of said locking means, being urged to closed position in which the several parts lie substantially flat and parallel to said frame.

8. A cooking grill of the character described in claim 7 wherein the means for moving the fire box vertically comprises a parallel motion linkage having lower fixed pivotal members mounted in said casing, and upper free pivotal members, the latter being adapted to engage slidingly an underside of said fire box, said elevating linkage being movable by means exterior to said casing, said linkage also carrying spring means anchored to said casing and adapted to counterbalance substantially the weight of said fire box, thereby facilitating adjustment of the elevation of said fire box through said linkage and handle.

FRANK LAWRENCE CARROLL.

REFERENCES CITED

The following references are of record in the file of this patent:

UNITED STATES PATENTS

| Number | Name | Date |
|---|---|---|
| 158,750 | Slichter | Jan. 12, 1875 |
| 279,770 | Knox | June 19, 1883 |
| 620,345 | Morawetz | Feb. 28, 1899 |
| 2,114,697 | Babin | Apr. 19, 1938 |
| 2,114,698 | Babin | Apr. 19, 1938 |
| 2,140,924 | Sather | Dec. 20, 1938 |
| 2,158,805 | Smith | May 16, 1939 |
| 2,292,377 | Howard | Aug. 11, 1942 |
| 2,325,828 | Betts | Aug. 3, 1943 |

FOREIGN PATENTS

| Number | Country | Date |
|---|---|---|
| 131,408 | Germany | June 11, 1902 |
| 416,202 | France | Oct. 14, 1910 |
| 530,070 | Germany | July 20, 1931 |